(12) United States Patent
Lees et al.

(10) Patent No.: US 11,879,785 B2
(45) Date of Patent: Jan. 23, 2024

(54) NON-UNIFORMITY CORRECTION FOR FOCAL PLANE ARRAYS

(71) Applicant: Goodrich Corporation, Charlotte, NC (US)

(72) Inventors: David Eric Berman Lees, Lexington, MA (US); Richard Norris Lane, Westford, MA (US)

(73) Assignee: Goodrich Corporation, Charlotte, NC (US)

( * ) Notice: Subject to any disclaimer, the term of this patent is extended or adjusted under 35 U.S.C. 154(b) by 719 days.

(21) Appl. No.: 17/032,215

(22) Filed: Sep. 25, 2020

(65) Prior Publication Data

US 2021/0096031 A1    Apr. 1, 2021

Related U.S. Application Data

(60) Provisional application No. 62/906,170, filed on Sep. 26, 2019.

(51) Int. Cl.
   *G01J 5/53*    (2022.01)
   *G01J 5/02*    (2022.01)
   *G01J 5/00*    (2022.01)

(52) U.S. Cl.
   CPC .............. *G01J 5/53* (2022.01); *G01J 5/027* (2013.01); *G01J 2005/0077* (2013.01)

(58) Field of Classification Search
   CPC ...... G01J 5/53; G01J 5/027; G01J 2005/0077; H04N 17/002; H04N 25/673; H04N 5/33
   See application file for complete search history.

(56) References Cited

U.S. PATENT DOCUMENTS

| | | | |
|---|---|---|---|
| 7,887,234 B2 | 2/2011 | Jonnalagadda et al. | |
| 8,049,163 B1 | 11/2011 | Granneman et al. | |
| 8,101,905 B2 | 1/2012 | Rogers | |
| 8,378,290 B1 | 2/2013 | Speake et al. | |
| 8,526,780 B2 | 9/2013 | Weisbach | |
| 2003/0183756 A1* | 10/2003 | Huniu | H04N 25/67 250/252.1 |
| 2008/0179520 A1 | 7/2008 | Kauffman et al. | |
| 2011/0108717 A1 | 5/2011 | Olson et al. | |
| 2018/0180485 A1* | 6/2018 | Macmillan | G01J 5/10 |

FOREIGN PATENT DOCUMENTS

| | | |
|---|---|---|
| CN | 102609923 B | 3/2014 |
| CN | 108519160 A | 9/2018 |
| CN | 107340064 B | 8/2019 |
| WO | 2018118801 A1 | 6/2018 |
| WO | 2018/237079 A1 | 12/2018 |

OTHER PUBLICATIONS

Extended European Search Report dated Jan. 12, 2021, issued during the prosecution of European Patent Application No. 20197422.7.

* cited by examiner

*Primary Examiner* — Lisa M Caputo
*Assistant Examiner* — Janice M Soto
(74) *Attorney, Agent, or Firm* — Locke Lord LLP; Joshua L. Jones; Scott D. Wofsy

(57) ABSTRACT

A method includes imaging a first graybody with a focal plane array (FPA), wherein the first graybody has a first emissivity, and imaging a second graybody having a lower emissivity than the first graybody. The method includes using data captured while imaging the first and second graybodies to perform non-uniformity correction (NUC) of the FPA.

9 Claims, 2 Drawing Sheets

NON-UNIFORMITY CORRECTION FOR FOCAL PLANE ARRAYS

CROSS REFERENCE TO RELATED APPLICATIONS

This application claims priority to U.S. Provisional Patent Application No. 62/906,170, filed Sep. 26, 2019. The entire contents of this application are incorporated herein by reference in their entirety.

BACKGROUND

1. Field

The present disclosure relates to imagery, and more particularly to non-uniformity correction for image sensors such as thermal imaging focal plane arrays (FPAs).

2. Description of Related Art

Thermal imaging FPAs have an inherent amount of non-uniformity from pixel to pixel. Traditional non-uniformity correction (NUC) requires uniform illumination of all pixels with each of two different optical irradiance levels. A linear transformation based on the two known irradiance levels can be used to make all the pixels read uniformly, canceling out non-uniformity. The conventional approach uses blackbodies at two different temperatures to provide the two different irradiance levels needed. NUC needs to be performed periodically in order to keep the pixels reading uniformly. In airborne applications, one blackbody can be used to obtain the blackbody calibration at a first temperature, and the sensor can be oriented at the outside view to obtain simulated blackbody irradiance at the ambient temperature. Since the outside view is not always at a significantly different temperature from the blackbody at the first temperature, and this cannot be controlled, this technique for airborne FPAs is limited in effectiveness.

The conventional techniques have been considered satisfactory for their intended purpose. However, there is an ever present need for improved systems and methods for non-uniformity correction for FPAs. This disclosure provides a solution for this need.

SUMMARY

A method includes imaging a first graybody with a focal plane array (FPA), wherein the first graybody has a first emissivity, and imaging a second graybody having a lower emissivity than the first graybody. The method includes using data captured while imaging the first and second graybodies to perform non-uniformity correction (NUC) of the FPA.

Imaging the first and second graybodies can include imaging each of the first and second graybodies with the first and second graybodies at the same temperature. The first graybody can be a blackbody. The second graybody can include a surface coated with a coating that provides less angular sensitivity than a specular mirror in a waveband of the FPA. The FPA can be sensitive to thermal infrared, and wherein imaging the first graybody and the second graybody can be performed at a temperature at which blackbody radiation peaks in the thermal infrared. Imaging the first graybody and imaging the second graybody can be performed without temperature controlling the first graybody or second graybody.

The first graybody can be located inside a pod at a first angular position, wherein the second graybody is located inside the pod at a second angular position, and wherein imaging the first graybody includes rotating the FPA to orient the FPA toward the first graybody, and wherein imaging the second graybody includes rotating the FPA to orient the FPA toward the second graybody. The method can include rotating the FPA to face a scene outside the pod after performing NUC. The method can include periodically repeating imaging the first graybody, imaging the second graybody, and performing NUC of the FPA in flight.

NUC can be performed in flight for an airborne imaging platform, wherein the NUC is in addition to a one-time calibration of the FPA that transforms raw sensor data from the FPA to a flat signal canceling low-frequency pixel to pixel variation. The one-time calibration of the FPA can be configured to provide calibration data to remove low-frequency rolloff in the FPA resulting from using the second graybody for NUC. The one-time calibration can include imaging a test graybody with the FPA to produce low-E data, subtracting a dark frame from the low-E data to produce low-E dark subtracted data, wherein the dark frame is representative of the FPA's dark current, imaging a test blackbody with the FPA to product blackbody data, subtracting the dark frame from the blackbody data to produce blackbody dark subtracted data, fitting a first polynomial to the low-E dark subtracted data, fitting a second polynomial to the blackbody dark subtracted data, and scaling each column of the low-E dark subtracted data by a ratio of the first and second polynomials to produce calibration data, and saving the calibration data for use in NUC. Imaging the test graybody can be performed with the test graybody at 36° C., and imaging the test blackbody can be performed with the test blackbody at 1° C.

A system includes a first graybody and a second graybody having lower emissivity than the first graybody, wherein the first graybody and second graybody are operatively connected to be at the same temperature. A focal plane array (FPA) is operatively connected to the first graybody and to the second graybody. A controller is operatively connected to the FPA to direct the FPA toward the first graybody to image the first graybody, and to direct the FPA toward the second graybody to image the second graybody, to perform non-uniformity correction (NUC) on the FPA based on data from imaging the first graybody and second graybody, and to capture image data from the FPA after NUC.

The second graybody can include a surface coated with a coating that provides less angular sensitivity than a specular mirror in a waveband of the FPA. The FPA can be sensitive to thermal infrared. The first graybody can be located inside a pod at a first angular position, wherein the second graybody is located inside the pod at a second angular position, and wherein the controller is configured to rotate the FPA to orient the FPA toward the first graybody for imaging the first graybody, and to rotate the FPA to orient the FPA toward the second graybody for imaging the second graybody. The controller can be configured to rotate the FPA to face a scene outside the pod after performing NUC. The controller is configured to perform NUC in flight for an airborne imaging platform. The controller can be configured to periodically repeat imaging the first graybody, imaging the second graybody, and NUC of the FPA in flight. The first graybody can be a blackbody. The controller can include calibration data configured to remove low-frequency rolloff in the FPA resulting from using the second graybody for NUC.

While shown and described herein in the context of an airborne platform, those skilled in the art will readily appreciate that systems and methods as disclosed herein can readily be implemented in any suitable type of platform such as spaceborne, ground telescopes, hand held night scopes on rifles, ground vehicle mounted, or boat mounted without departing from the scope of this disclosure.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
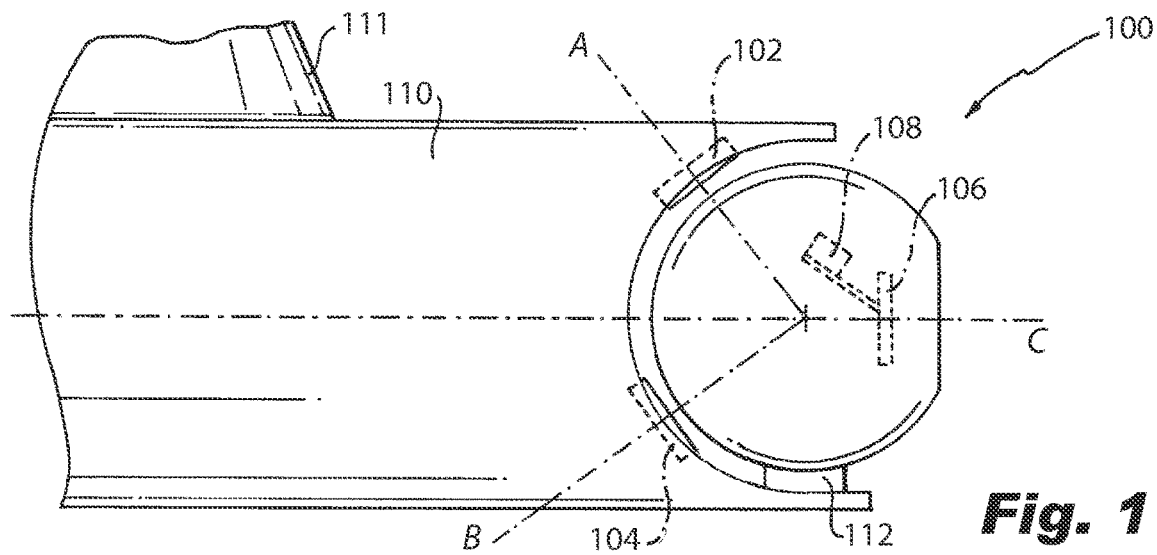
FIG. 1 is a schematic view of an embodiment of a system constructed in accordance with the present disclosure, showing the focal plane array (FPA) directed outside the pod for imaging an external scene.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide non-uniformity correction (NUC) for focal plane arrays (FPAs) such as thermal imaging FPAs.

The system 100 includes a first graybody 102 and a second graybody 104 having lower emissivity than the first graybody. A focal plane array (FPA) 106 is operatively connected to the first graybody 102 and to the second graybody NUC. Those skilled in the art will readily appreciate that there can optionally be a lens in front of the FPA 106 for optically coupling the FPA to the first and second gray bodies 102, 104, and for forming images of a scene. A controller 108 is operatively connected to the FPA 106 move the FPA 106 to direct the FPA 106 toward the first graybody 102 to image the first graybody 102, and to direct the FPA 106 toward the second graybody 104 to image the second graybody 104, and to perform non-uniformity correction (NUC) on the FPA 106 based on data from imaging the first graybody 102 and second graybody 104. The controller 108 is also configured to use the FPA 106 capture image data from the FPA 106 after NUC. The first graybody 102 can be a blackbody. As used herein, a blackbody is a species of the genus of graybodies, or in other words a blackbody is a graybody with an emissivity of unity (1.0) or near enough to unity for practical applications.

Figure 2:
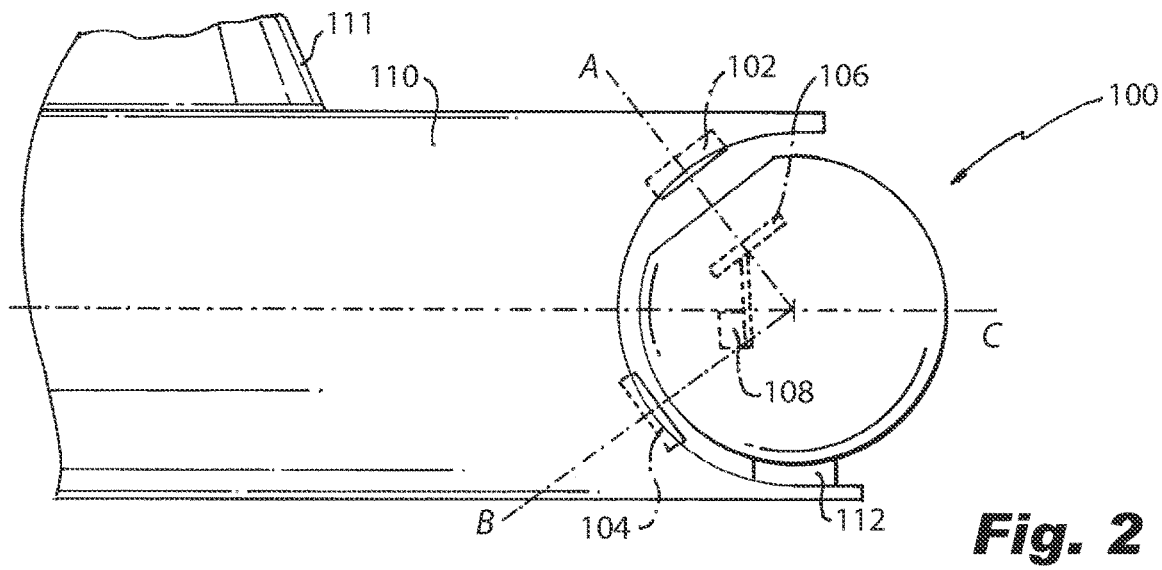
FIG. 2 is a schematic view of the system of FIG. 1, showing the FPA directed toward a first graybody within the pod.
Figure 3:
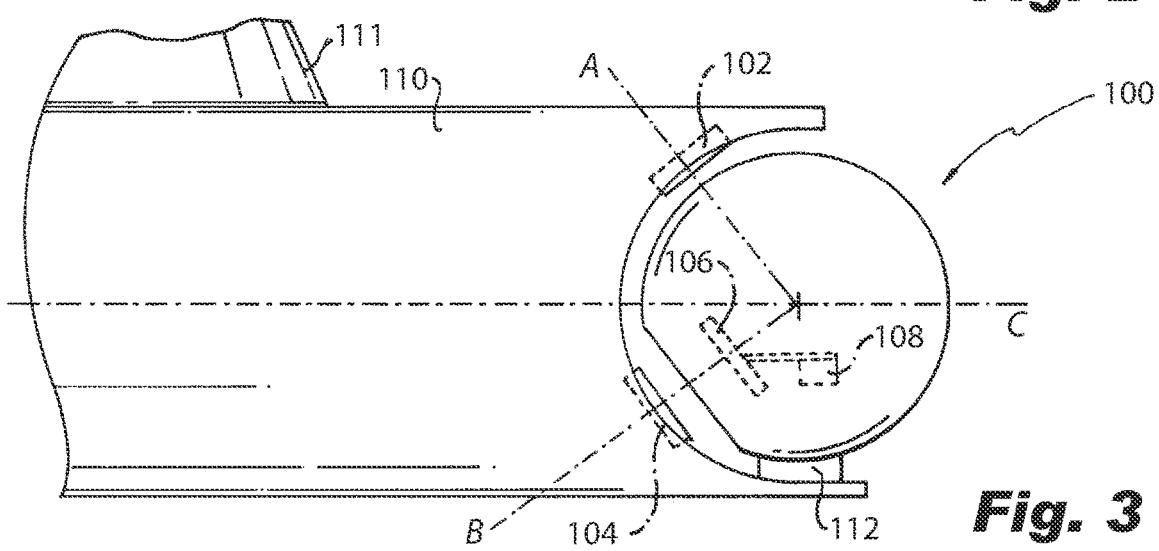
FIG. 3 is a schematic view of the system of FIG. 1, showing the FPA directed toward a second gray body within the pod.

The first graybody 102 and second graybody 104 are operatively connected within a pod 110 so as to be at the same temperature as one another, or to be near enough to the same temperature with each other for practical implantation of techniques disclosed herein. It is also contemplated that the two graybodies 102, 104 can be at different temperatures. The second graybody 104 includes a surface coated with a coating that provides less angular sensitivity than a specular mirror in a waveband of the FPA, and that provides graybody emissivity lower than the emissivity of the first graybody 102. Using a specular mirror would let the pixels in the FPA 106 "see" themselves at the cooled temperature inside a Dewar, but that is very angular sensitive. The FPA can be sensitive to thermal infrared, i.e. for thermal IR imagery. The first graybody 102 is located inside the pod 100 at an angular position aligned along an axis A. The second graybody 104 is located inside the pod 110 at different angular position aligned along an axis B. The controller 108 is configured to rotate the FPA 106 (e.g. by controlling the gimbal 112) to orient the FPA 106 toward the first graybody 102 for imaging the first graybody 102 (as shown in FIG. 2), and to rotate the FPA to orient the FPA 106 toward the second graybody 104 (as shown in FIG. 3) for imaging the second graybody 104. The controller 108 is also configured to rotate the FPA 106 to face a scene outside the pod 110 after performing NUC, e. aligning the FPA 106 along the axis C or any other axis for viewing external from the pod 110. The controller 108 is configured to perform NUC in flight for an airborne imaging platform, e.g., wherein the pod 110 is mounted to an airborne platform 111. The controller 108 can be configured to periodically repeat imaging the first graybody 102, imaging the second graybody 104, and performing NUC of the FPA 106 in flight. The controller 106 can include calibration data configured to remove low-frequency rolloff in the FPA 106 resulting from using the second graybody 104 for NUC instead of using a blackbody for both irradiance levels in NUC.

A method includes imaging the first graybody 102 with the FPA 106, wherein the first graybody has a first emissivity and is at a first temperature. The method includes imaging the second graybody 104, which simulates a blackbody having a lower temperature than the first graybody 102 even though the second graybody 104 is at the same temperature as the first graybody 102. This is because the second graybody 104 has a lower emissivity than the first graybody 102. The method includes using data captured while imaging the first and second graybodies 102 and 104 to perform non-uniformity correction (NUC) of the FPA. Imaging the first graybody 102 and the second graybody 104 can both be performed at a temperature at which blackbody radiation peaks in the thermal infrared. Imaging the first graybody 102 and imaging the second graybody 104 can be performed without temperature controlling the first graybody 102 or second graybody 104. Imaging the first graybody 102 includes rotating the FPA 106 to orient the FPA 106 toward the first graybody 102 as shown in FIG. 2. Imaging the second graybody 104 includes rotating the FPA 106 to orient the FPA 106 toward the second graybody 104 as shown in FIG. 3. The method can include rotating the FPA 106 to face a scene outside the pod after performing NUC, as shown in FIG. 1. The method can include periodically repeating imaging the first graybody 102, imaging the second graybody 104, and performing NUC of the FPA 106 in flight.

NUC can be performed in flight for an airborne imaging platform (e.g., wherein the pod 110 is mounted to an airborne platform 111).

Figure 4:
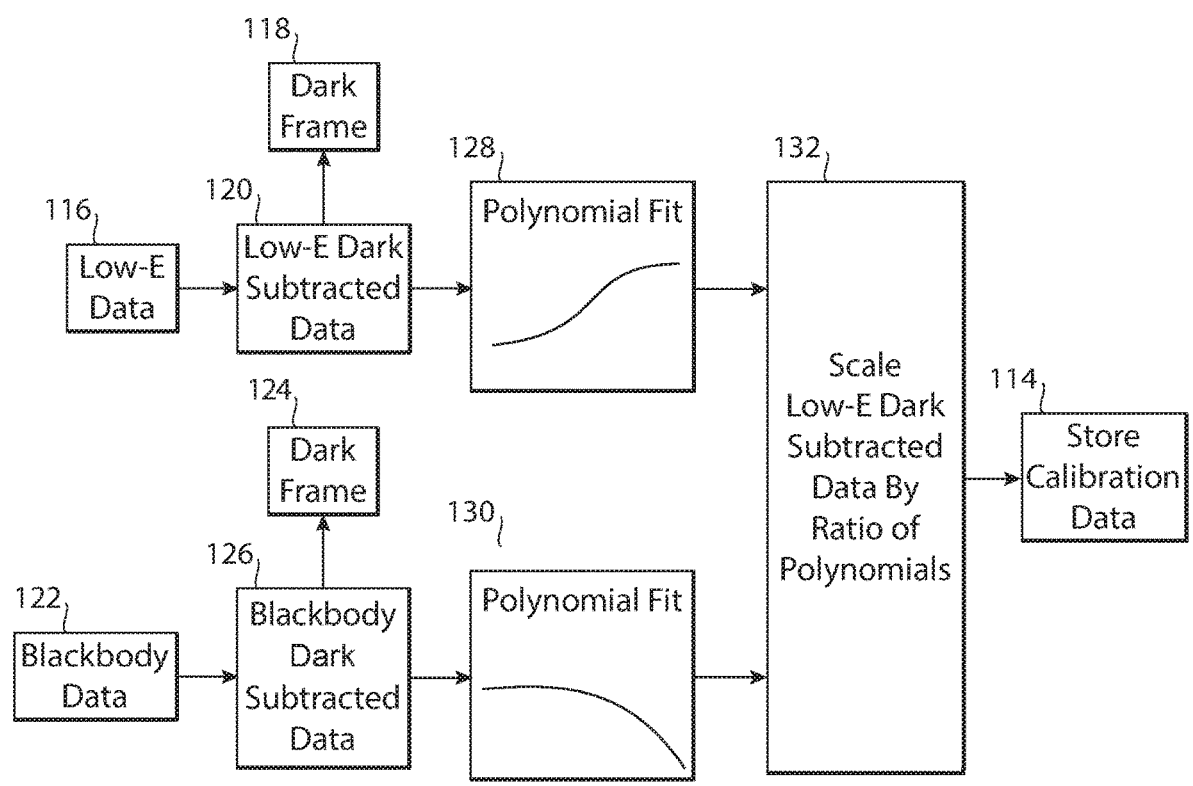
FIG. 4 is a diagram of an exemplary embodiment of a process for calibration of the system of FIG. 1.

With reference now to FIG. 4, the NUC described above is in addition to a one-time calibration of the FPA 106 that transforms raw sensor data from the FPA 106 to a flat signal canceling low-frequency pixel to pixel variation. The one-time calibration of the FPA 106 is configured to provide calibration data (as indicated in FIG. 4 with box 114) to remove low-frequency rolloff in the FPA 106 that results from using the second graybody 104 for NUC. Low-frequency in this sense is quantified relative to the relatively high frequency of the non-uniform raw sensor data from the FPA 106. The one-time calibration can include imaging a test graybody with the FPA to produce low-E data as indicated in FIG. 4 with box 116, and subtracting a dark frame (indicated in FIG. 4 with box 118) from the low-E data to produce low-E dark subtracted data as indicated in FIG. 4 with box 120, wherein the dark frame is representative of the dark current of the FPA 106. The calibration includes imaging a test blackbody with the FPA 106 to product blackbody data (as indicated in FIG. 4 with box 122) and subtracting the dark frame (indicated in FIG. 4 by box 124, which is the same dark frame indicated by box 118) from the blackbody data to produce blackbody dark subtracted data as indicated in FIG. 4 by box 126. The calibration includes fitting a first polynomial to the low-E dark subtracted data (as indicated in FIG. 4 by box 128 and fitting a second polynomial to the blackbody dark subtracted data (as indicated in FIG. 4 by the box 130). The calibration includes scaling each column (representing a column of pixels in the FPA 106) of the low-E dark subtracted data 120 by a ratio of the first and second polynomials (in boxes 128 and 130) to produce calibration data as indicated by box 132, and saving the calibration data for use in NUC as indicated in box 114. Imaging the test graybody can be performed with the test graybody at 36° C., and imaging the test blackbody can be performed with the test blackbody at 1° C. Any other temperatures with a suitably large difference can be used. The dark subtraction and ratio is not necessary when the surface characteristics are the same for the blackbody or graybody sources. The reason for using the low-E surface is that the surface reflectance characteristics of the low-E surface are very different from the black body source.

Those skilled in the art will readily appreciate that the polynomial fitting for reducing/eliminating low-frequency rolloff may not be needed in some applications, e.g., depending on the sensor configuration. Those skilled in the art will also readily appreciate that imaging in this context does not require forming a focused image on a sensor. For example, the graybodies can be positioned closer than the minimum focusing distance without departing from the scope of this disclosure. Those skilled in the art will readily appreciate that calibration in this context is not to be confused with the process of creating NUC coefficients to be applied to the pixels or applying the NUC coefficients.

The methods and systems of the present disclosure, as described above and shown in the drawings, provide for NUC with improved performance given potentially reduced cost and weight, e.g. for airborne sensor systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
    imaging a first graybody with a focal plane array (FPA), wherein the first graybody has a first emissivity;
    imaging a second graybody having a lower emissivity than the first graybody; and
    using data captured while imaging the first and second graybodies to perform non-uniformity correction (NUC) of the FPA, wherein the first graybody is located inside a pod at a first angular position, wherein the second graybody is located inside the pod at a second angular position, and wherein imaging the first graybody includes rotating the FPA to orient the FPA toward the first graybody, and wherein imaging the second graybody includes rotating the FPA to orient the FPA toward the second graybody, wherein NUC is performed in flight for an airborne imaging platform, wherein the NUC is in addition to a one-time calibration of the FPA that transforms raw sensor data from the FPA to a flat signal canceling low-frequency pixel to pixel variation, wherein the one-time calibration of the FPA is configured to provide calibration data to remove low-frequency rolloff in the FPA resulting from using the second graybody for NUC, wherein the one-time calibration includes:
    imaging a test graybody with the FPA to produce low-E data;
    subtracting a dark frame from the low-E data to produce low-E dark subtracted data, wherein the dark frame is representative of the FPA's dark current;
    imaging a test blackbody with the FPA to product blackbody data;
    subtracting the dark frame from the blackbody data to produce blackbody dark subtracted data;
    fitting a first polynomial to the low-E dark subtracted data;
    fitting a second polynomial to the blackbody dark subtracted data; and
    scaling each column of the low-E dark subtracted data by a ratio of the first and second polynomials to produce calibration data, and saving the calibration data for use in NUC.

2. The method as recited in claim 1, wherein imaging the first and second graybodies includes imaging each of the first and second graybodies with the first and second graybodies at the same temperature.

3. The method as recited in claim 1, wherein the second graybody includes a surface coated with a coating that provides less angular sensitivity than a specular mirror in a waveband of the FPA.

4. The method as recited in claim 1, wherein the FPA is sensitive to thermal infrared, and wherein imaging the first graybody and the second graybody are performed at a temperature at which blackbody radiation peaks in the thermal infrared.

5. The method as recited in claim 1, wherein imaging the first graybody and imaging the second graybody are performed without temperature controlling the first graybody or second graybody.

6. The method as recited in claim 1, further comprising rotating the FPA to face a scene outside the pod after performing NUC.

7. The method as recited in claim 1, further comprising periodically repeating imaging the first graybody, imaging the second graybody, and performing NUC of the FPA in flight.

8. The method as recited in claim 1, wherein imaging the test graybody is performed with the test graybody at 36° C., and wherein imaging the test blackbody is performed with the test blackbody at 1° C.

9. The method as recited in claim 1, wherein the first graybody is a blackbody.

* * * * *